Nov. 24, 1953 J. C. WILLIAMS 2,660,668
APPARATUS FOR FREQUENCY DIVISION
Filed Dec. 15, 1949 8 Sheets-Sheet 1
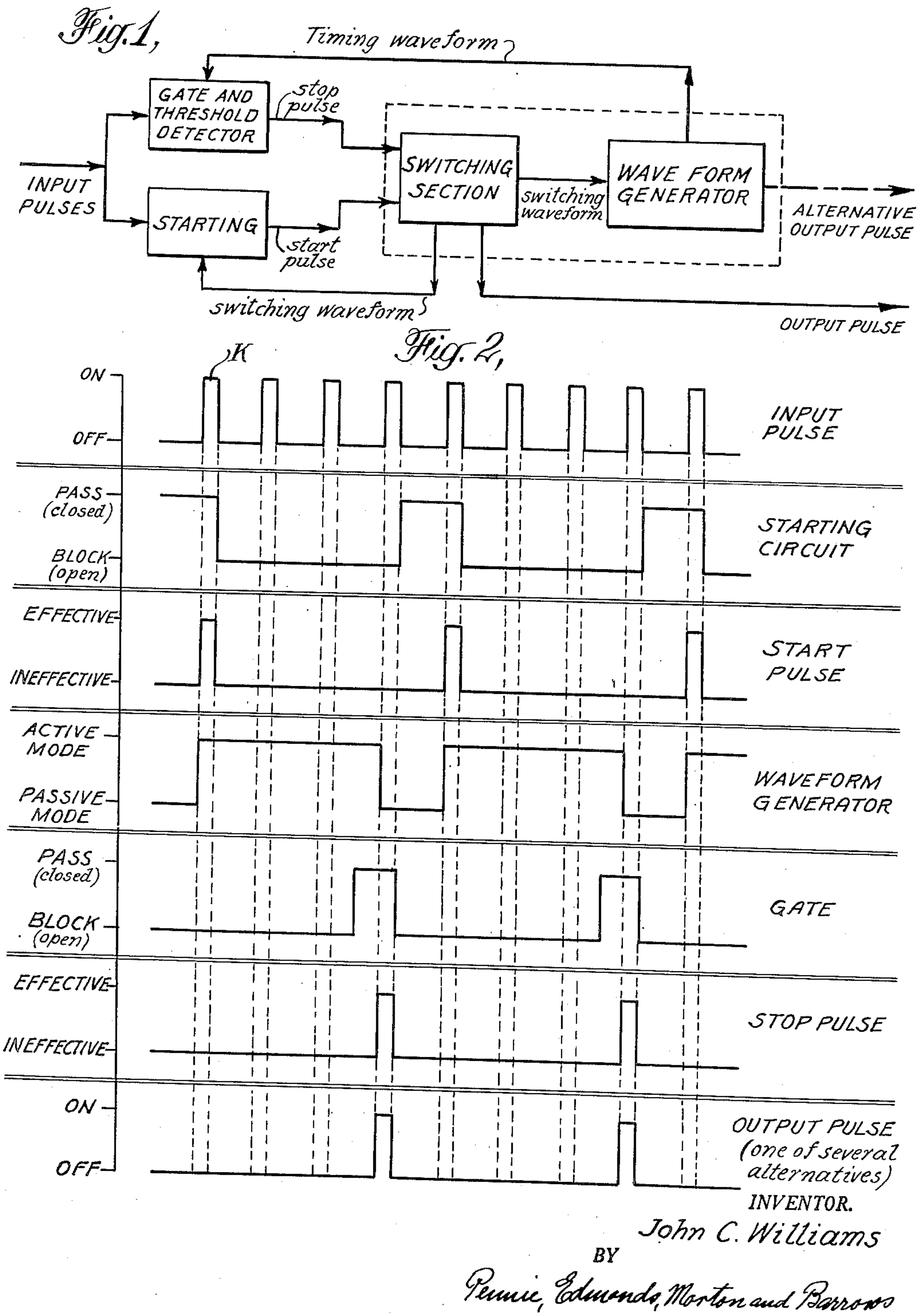
Fig. 1, Fig. 2,
INVENTOR.
John C. Williams
BY
Pennie, Edmonds, Morton and Barrows
ATTORNEYS INVENTOR
John C. Williams
BY
Pennie, Edmonds, Morton and Barrows
ATTORNEYS INVENTOR.
John C. Williams
BY
Pennie, Edmonds, Morton and Barrows
ATTORNEYS INVENTOR
John C. Williams
BY Pennie, Edmonds, Morton and Barrows
ATTORNEYS Nov. 24, 1953 J. C. WILLIAMS 2,660,668

APPARATUS FOR FREQUENCY DIVISION

Filed Dec. 15, 1949 8 Sheets-Sheet 5

INVENTOR
John C. Williams
BY Pennie, Edmonds, Morton and Barrows
ATTORNEYS

Nov. 24, 1953 J. C. WILLIAMS 2,660,668
APPARATUS FOR FREQUENCY DIVISION
Filed Dec. 15, 1949 8 Sheets-Sheet 6
Fig. 9,
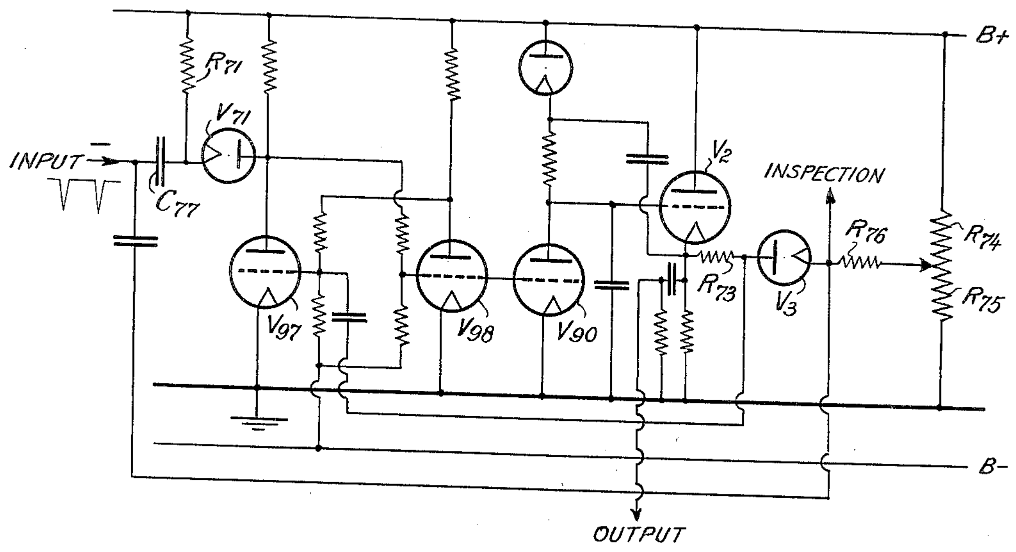
Fig. 10,
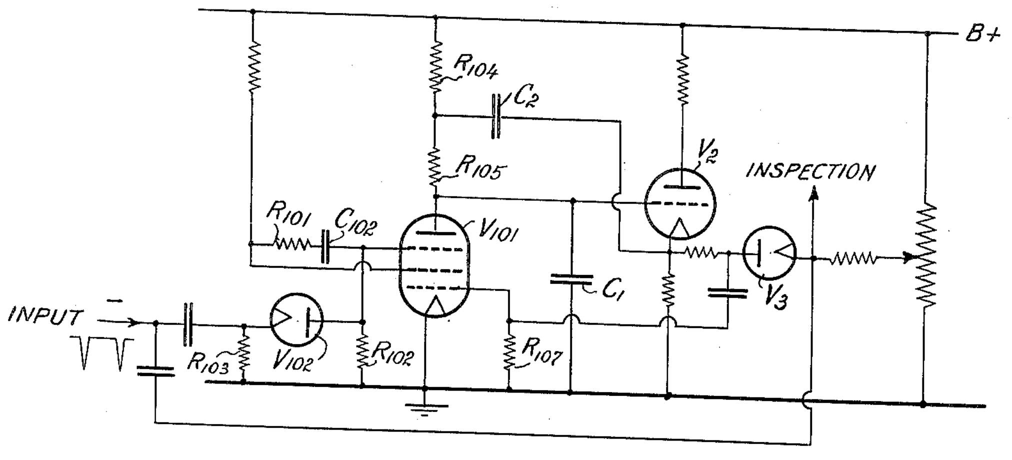
INVENTOR
John C. Williams
BY
Pennie, Edmonds, Morton and Barrows
ATTORNEYS INVENTOR.
John C. Williams
BY
Pennie, Edmonds, Morton and Barrows
ATTORNEYS Nov. 24, 1953 J. C. WILLIAMS 2,660,668

APPARATUS FOR FREQUENCY DIVISION

Filed Dec. 15, 1949 8 Sheets-Sheet 8

INVENTOR
John C. Williams
BY
Pennie, Edmonds, Morton and Barrows
ATTORNEYS

Patented Nov. 24, 1953

2,660,668

UNITED STATES PATENT OFFICE 2,660,668

APPARATUS FOR FREQUENCY DIVISION

John C. Williams, Cambridge, Mass.

Application December 15, 1949, Serial No. 133,057

24 Claims. (Cl. 250—27)

This invention relates to frequency division by integral factors, that is, to the derivation of a periodic electrical signal of one frequency from a periodic electrical signal of another frequency, which may be ten or twenty or more times higher, or less.

It is often desirable to produce an accurately recurring electrical signal at frequencies far below those for which crystal oscillators may be prepared, and frequency dividing circuits are employed for this purpose. The frequency dividing circuits that have been employed hitherto have been classifiable principally as frequency insensitive counters, sine wave dividers, synchronized free running oscillators of sinusoidal or non-sinusoidal waveform, and step charging dividers. All of these types suffer from one or more shortcomings. Thus some depend upon the constants of circuit elements for determining natural periods of oscillation. Others depend upon accurately maintained $B^+$ and bias voltages, as the superposition of voltages derived therefrom controls the operation of the circuit. Others depend upon accurately maintained tube currents to control the size of absolute increments of charge. The free running oscillator type also furnishes an output or quotient signal even when there is no input or dividend signal, an important disadvantage for some purposes.

The present invention provides a method and means of frequency division which surmounts these disadvantages. A frequency divider according to the present invention can be made to require an input signal to produce an output signal, employs no tuned circuits, and is largely independent of supply voltages and of the age and condition of the tubes and circuit elements employed.

A frequency divider according to the present invention includes, functionally, four principal components, a waveform generator, a switching section, a start circuit, and a stop gate.

The waveform generator is employed to generate a timing waveform for the determination of the quotient frequency. The timing waveform in general will consist of two discontinuous parts, one being characteristic of the waveform generator as such (usually a sawtooth) and the other being the output from the waveform generator during a passive or recycling phase. The duration of each part is held by the input signal to an integral number of input signal periods. The quotient frequency, having a period equal to the sum of these two parts, is therefore integrally related to the input or dividend frequency.

Closely associated with the waveform generator is a switching section, employed to drive the waveform generator through its separate phases. The switching section is a circuit having two modes of conduction, one associated with the generation of the characteristic waveform of the waveform generator and the other associated with repose of the waveform generator. In order to preclude the appearance of a quotient signal in the absence of an input signal, the switching section may advantageously be chosen to be monostable, that is with one of its modes of conduction stable and the other transient. Typically, the waveform generator and switching section will be so connected that the characteristic waveform is produced during the transient mode of the switching section, the waveform generator being quiescent while the switching section is in its stable mode. The stable phase is employed to permit the waveform generator (in particular the condenser or condensers thereof) to restore itself to a condition appropriate to renewed generation of the characteristic waveform.

A starting circuit is employed to connect the input or dividend signal to the switching section momentarily so that it may turn the waveform generator on. The starting circuit therefore functions as a switch. To trigger the switching section, the input signal should be of pulse shape, whatever the shape of the signal actually to be divided. A pulse signal of the same fundamental frequency can be provided by known means for application to the circuits of the present invention. Initiation of the characteristic waveform at once opens the starting circuit so as to insulate the waveform generator as a whole (i. e. including the switching section) from the input signal during generation of the characteristic waveform.

Lastly, a gate or stop circuit controlled by the waveform generator is employed to establish a second connection between the input signal and the switching section in order to turn the waveform generator off. As soon as the gate circuit has permitted the waveform generator to be turned off, the gate circuit is itself opened again so that the waveform generator may be re-activated. Coincident with opening of the gate circuit the starting circuit is re-established (starting switch closed) so that the next (or, if desired, the second next, third next, etc.) arriving input signal in fact re-initiates generation of the characteristic waveform.

The waveform generator is most conveniently realized by means of a generator producing a sawtooth wave of voltage. The length of the sawtooth, which serves to determine the division ratio, is determined by an independently established threshold voltage. In passing the threshold voltage, the sawtooth activates or closes the gating circuit, through which the sawtooth voltage is terminated by the input signal at an integral number of input signal periods after its initiation.

According to one feature of my invention a high degree of stability in the division ratio is obtained by a connection which ties the threshold voltage to the same ultimate source of voltage as that which generates the sawtooth portion of the timing waveform. In this way variations in the value of this voltage source are partly or wholly canceled, and the time required for the sawtooth to reach the threshold voltage is rendered substantially independent of such variations.

In some embodiments of my invention two or more of the four essential functional components may be embodied, in whole or in part, in common physical circuit elements. The start circuit for example, may include no more than the elements necessary to form a signal channel between the input signals and an appropriate point in the switching section. Variations in the voltage at this point, resulting from the operation of the switching section itself, suffice effectively to "make" and "break" the connection at that point. In another instance the switching section and waveform generator are embodied together in an oscillator producing the desired sawtooth wave of voltage.

My invention will now be described by reference to the accompanying drawings in which:

Fig. 1 is a block diagram illustrating the functional components of a frequency dividing circuit according to the present invention.

Fig. 2 is a diagram representing in a general manner the time sequence of events at typical points in a circuit of the form shown in Fig. 1.

Fig. 9 is a schematic diagram of another embodiment of my invention employing a switching section different from that of Fig. 3.

Fig. 10 is a schematic diagram of another embodiment of my invention employing still another form of switching section.

In Fig. 1 the four functional components of my invention are illustrated in block form with the necessary signal channels shown as lines connecting the blocks. The input signal, a series of pulses having the repetition rate of the frequency to be divided, is applied to the switching section at separate points through the starting circuit and through the gate. Hereinafter, the starting circuit and stop gate, whose functions are analogous to those of switches, will be said to be closed when they provide signal paths between the input signal source and the switching section and to be open when they provide no signal path.

When the switching section is in its stable mode of conduction, as it may be assumed to be in the absence of an input signal, the sawtooth generating circuit will be quiescent. The connection between the switching section and the start circuit is such that this circuit is then closed. Conversely, the stop gate is open. Therefore, an input pulse, while blocked at the stop gate, passes through the start circuit to the switching section where it is applied at such a point that the switching section is induced by regenerative action to shift to its transient mode of conduction. A consequent change in voltage in the switching section initiates generation of the sawtooth voltage in the sawtooth generator, usually by opening or closing an electronic switch in parallel with a sawtooth condenser, which is correspondingly discharged or charged during the recycling phase. Succeeding input pulses have no access to the switching section through either the start circuit or stop gate until the sawtooth voltage as applied to a threshold detector forming part of the stop gate closes that gate. The first input pulse arriving after the sawtooth voltage reaches the threshold passes through the stop gate, restores the switching sections to its stable mode and discharges the sawtooth.

The time sequence of events occurring in a circuit fulfilling the requirements of Fig. 1 are diagrammatically shown in Fig. 2, where the division ratio is arbitrarily assumed to be four. The input pulses are shown as beginning with a pulse K, before which the circuits were quiescent.

Figure 3:
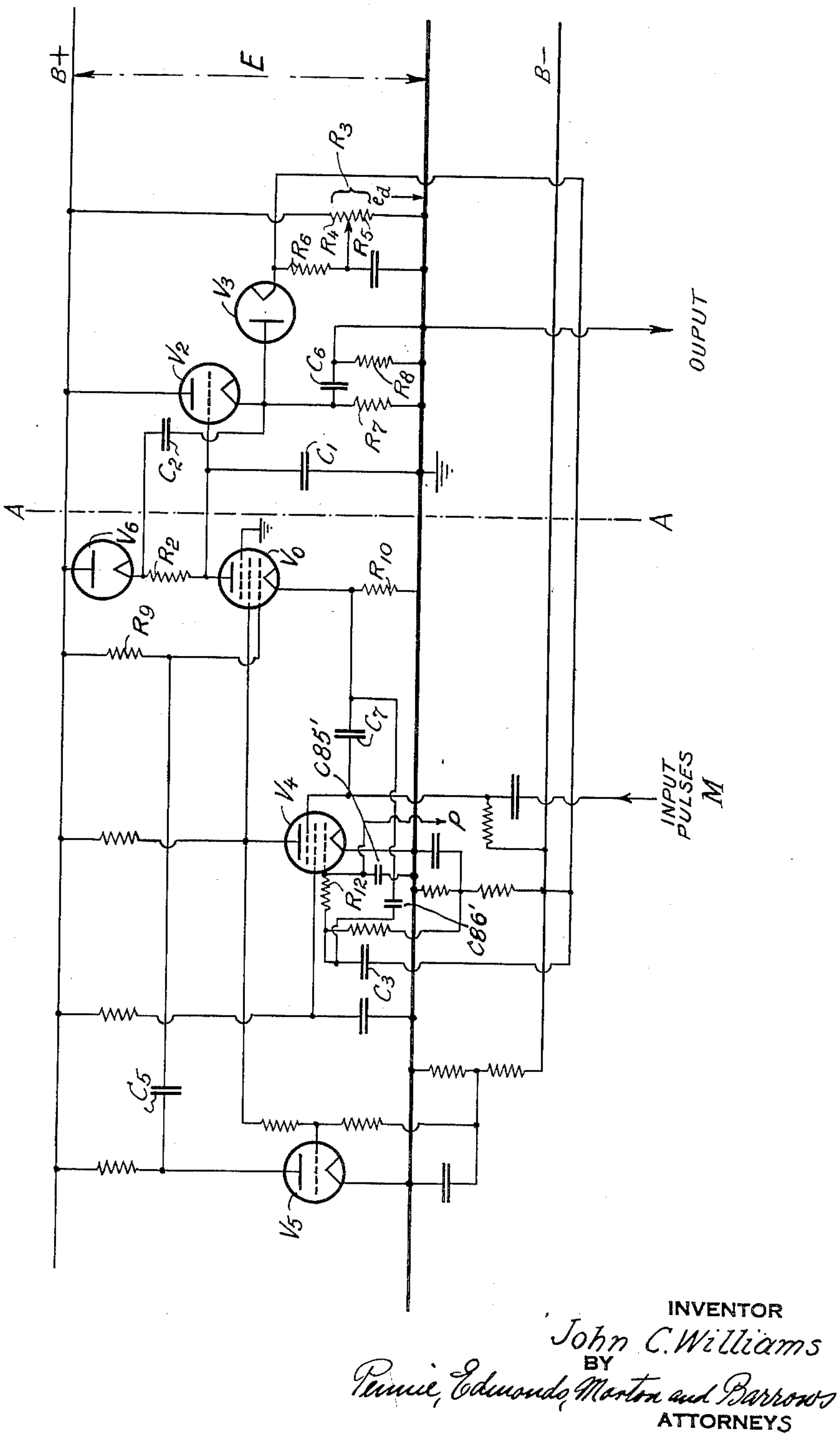
Fig. 3 is a schematic diagram of one embodiment of my invention.

One embodiment of my invention is shown schematically in Fig. 3. The sawtooth generator in this circuit consists of the condenser $C_1$ charged through a resistor $R_2$, and the plate-cathode discharge path of $V_0$, together with the cathode resistor $R_{10}$ of $V_0$. $V_2$, $C_2$ and $V_6$ form a linearizing circuit which renders nearly straight the slope of the sawtooth voltage on the plate of $V_0$. This sawtooth is reproduced on the cathode of $V_2$. The sawtooth generator is turned on and off by the plate-cathode path of pentode $V_0$ functioning as a switch.

The switching section consists of the triode $V_5$ and of a second triode formed by the screen grid, control grid, and cathode of $V_0$. These two triodes are connected together as a monostable delay multivibrator. The time constant of this multivibrator is chosen larger than the maximum length of sawtooth to be employed so that the circuit never returns spontaneously to the stable mode except when the input pulses are discontinued. In the stable mode of conduction screen current flows in $V_0$, and $V_5$ is cut off. The waveform generator as a whole thus includes $V_0$, $V_2$, $V_5$ and $V_6$.

The start circuit is provided in effect by $C_7$ and $R_{10}$, the cathode resistor of $V_0$. The gate circuit includes the threshold diode $V_3$, the threshold potentiometer $R_4R_5$, and the pentode $V_4$. $R_4R_5$ is connected between the same limits of potential E as the sawtooth generator. Input pulses for starting are applied through $C_7$ to the cathode of $V_0$ and for stopping to the suppressor grid of $V_4$, in which the gating voltage is applied to the control grid.

Figure 4:
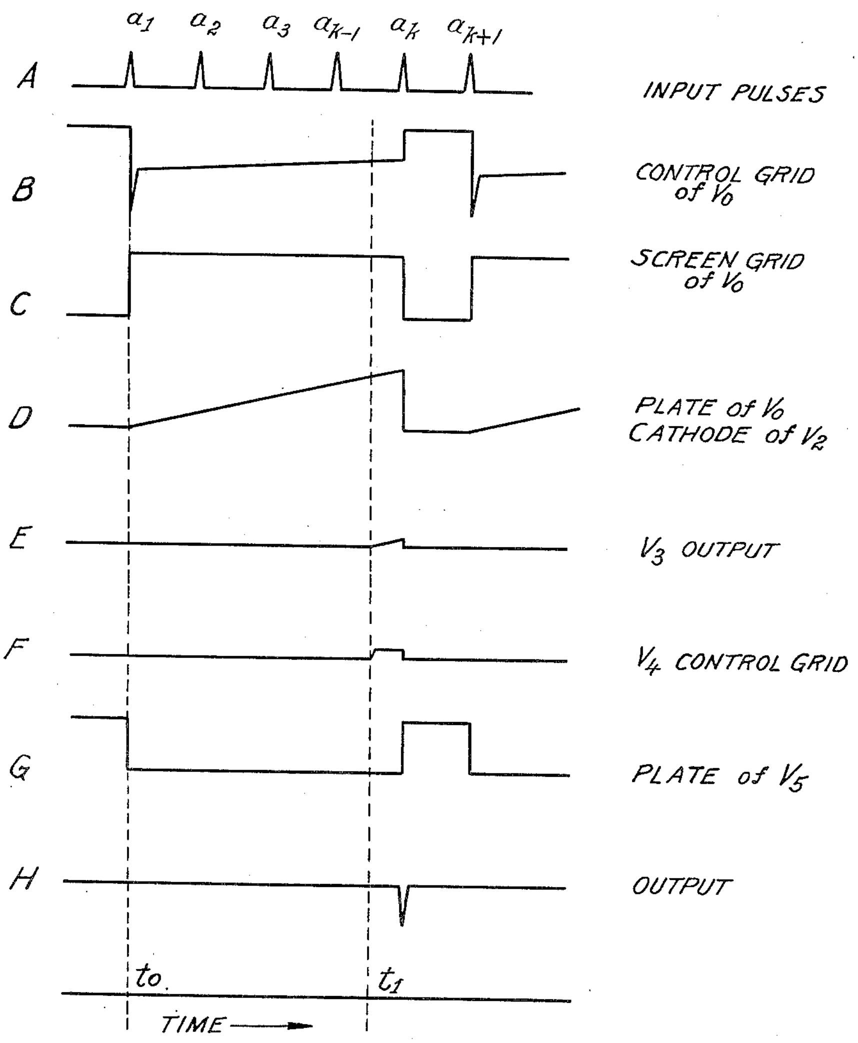
Fig. 4 is a representation of certain voltage waveforms to be found in the circuit of Fig. 3.

The operation of the circuit of Fig. 3 will now be described. With no input pulses, the switching section is in its stable mode. $V_0$ is conducting with its grid at zero bias. $V_5$ is off as the other half of the multivibrator and $V_4$ is off by bias on its control and suppressor grids, each grid being beyond its own cutoff level. The plate of $V_0$ is close to ground potential. A series of positive going pulses A in Fig. 4 is applied to the circuit at M. The waveform A of Fig. 4 is derived by conventional means not shown from the frequency to be divided, its pulse repetition rate being equal to the fundamental frequency of the dividend signal. The first arriving pulse $a_1$ finds $V_4$ insensitive due to control grid bias. However it cuts off conduction in $V_0$ by raising the cathode thereof. The screen of $V_0$ rises, bringing $V_5$ into conduction. The resulting multivibrator action between $V_5$ and the screen grid-cathode path of $V_0$ drives the control grid of $V_0$ beyond cutoff. $V_0$ thus remains cut off even after the end of the positive signal $a_1$.

The succeeding input pulses $a_2$, $a_3$ . . . have no effect since $V_4$, to which they are applied with an effective positive polarity, remains cut off on its control grid and since $V_0$, to which they are applied with an effective negative polarity, is already cut off. The anode of $V_0$, previously at a very low positive potential with respect to ground, now rises according to a modified exponential shown as waveform D in Fig. 4. A linearizing circuit consisting of $V_6$, $C_2$, and $V_2$ renders the charging curve nearly linear. Because of the substantially unity gain of the cathode follower $V_2$, waveform D also represents the potential on the anode of $V_3$. When the anode of $V_3$ rises above the threshold level established for the cathode of $V_3$ by the setting of the potentiometer $R_4R_5$ 5, $V_3$ conducts. Disregarding the D. C. bias level, the output of the cathode of $V_3$ is indicated as waveform E in Fig. 4. If time is counted from the instant $t_0$ (Fig. 4) at which a pulse $a_1$ cuts off $V_0$, the time $t_1$ at which the diode output of waveform E begins can evidently be controlled by variation in the threshold level $e_d$ at the potentiometer $R_3$.

Waveform E is applied to the control grid of $V_4$ through a blocking condenser $C_3$ and limiting resistor $R_{12}$. It lifts the grid of $V_4$ to zero bias and holds it there as long as the sawtooth of waveform D remains above the threshold level. The waveform on the grid of $V_4$ is thus as shown at F in Fig. 4.

When the next input pulse $a_k$ arrives, it finds $V_0$ still cut off by multivibrator action but it swings the suppressor of $V_4$ substantially above cutoff, and plate current flows in $V_4$. As the plate of $V_4$ falls, even though only for the duration of the input pulse $a_k$, it cuts off $V_5$ and reverses the conducting phase in the multivibrator. This restores $V_0$ to conduction at zero bias and produces rapid discharge of the condenser $C_1$. The consequent changes in potential in the multivibrator are shown in waveforms B, C and G. The control grid of $V_0$ returns to zero, its screen grid drops and the plate of $V_5$ rises as that tube is cut off. For the remainder of the *kth* input cycle, the circuit is at rest, and the elements restore themselves to their initial conditions.

The next arriving input pulse $a_{k+1}$ finds the circuit in the condition which existed on the arrival of the first pulse $a_1$, and the cycle of the quotient or output frequency begins again.

Accurately timed output pulses having the repetition rate of the quotient frequency may be obtained by differentiating any of several waveforms. For example, the peaker comprising $C_6$ and $R_8$ provides an output pulse from the fall in voltage at the cathode of $V_2$ when the sweep condenser is discharged, as shown in waveform H of Fig. 4.

The operation of the circuit of Fig. 3 may be monitored by observing on an oscilloscope the voltage on the grid of $V_4$ together with a fraction of the input pulses. For this purpose a condenser $C_{86'}$ couples into the grid circuit of $V_4$ a fraction of the input pulses, and a condenser $C_{85'}$ from the grid of $V_4$ to ground prevents this fraction of the input pulses from firing $V_4$ prematurely. A lead brought out from the grid of $V_4$ to P may be provided to facilitate such inspection.

The circuit of Fig. 3 possesses a high degree of stability in the face of variations in the B+ voltage E applied. With no signal applied to the grid of $V_0$, i. e. during recycling, a small steady voltage $E_c$ (usually of the order of a few volts only) exists across the switch tube $V_0$ and hence across the sawtooth condenser $C_1$. Let the sawtooth voltage developed when $V_0$ is shut off be indicated as $e'_c$. The total voltage $e_c$ across $C_1$ will then be $E_c+e'_c$.

It can be shown that, neglecting second order effects, the sawtooth voltage at any time $t$ after initiation of the sawtooth is $$e'_c=(E-E_c)\left[\Lambda\left(1-\epsilon^{\frac{t}{\Lambda\tau}}\right)\right] \qquad (1)$$

In this expression $\tau=R_2C_1$ and E is the applied voltage, the drop across $V_6$ being negligible. $\Lambda$ is a linearity factor, involving physical constants of the circuit as follows:

$$\Lambda=\frac{1}{\frac{1+\eta}{\eta}-A}$$

$$\eta=\frac{C_2}{C_1}$$

$$A=\text{gain of } V_2$$

Similarly the voltage $e_k$ at the cathode of the cathode follower $V_2$ during the sawtooth will be made up of a sawtooth component $e'_k$ added to a steady state value $E_k$. $E_k$ is greater than $E_c$. The value of $e_k$ is given as follows:

$$e_k=A(E-E_c)\left[\Lambda\left(1-\epsilon^{\frac{-t}{\Lambda\tau}}\right)\right]+E_k \qquad (2)$$

If the linearization is assumed to be perfect, the linearity factor $\Lambda$ will be of infinite value so that the cathode follower output $e_k$ will be $$e_k=(E-E_c)\frac{t}{\tau}+E_k \qquad (3)$$

If no linearization is employed, i. e. $C_2$ and its connections omitted and $V_6$ replaced by a zero impedance conductor, A will have unity value, and the sawtooth will be an exponential:

$$e_k=A(E-E_c)\left(1-\epsilon^{\frac{-t}{\tau}}\right)+E_k \qquad (4)$$

Whether the linearization is assumed to be perfect as in (3) or finite as in (2), or absent as in (4), the value of the cathode follower output voltage $e_k$ can be represented by the generalized equation $$e_k=(E-E_c)f(t,\alpha)+E_k \qquad (5)$$

in which $f(t, \alpha)$ is a function describing change of amplitude with time and with physical constants (all of which constants are denoted symbolically by the term $\alpha$).

The threshold voltage $e_d$ is $$e_d=E\frac{R_5}{R_4+R_5} \qquad (6)$$

This is the absolute value which must be reached by the output of the cathode follower in order that the threshold diode $V_3$ may become conductive.

The grid of the gating tube $V_4$ is subjected to a steady negative bias $E_{cc}$ greater than cutoff, which must be overcome by the gate on the cathode of $V_3$ in an amount sufficient to render $V_4$ operative. This minimum amount by which the grid of $V_4$ must be lifted by the gate will bring that grid to a level between the cutoff and zero bias values for $V_4$, and will be denoted as $e_g$. The necessary condition for opening the gate embodied in the tube $V_4$ may then be written $$e_k=e_d+e_g$$

From Equations 5 and 6 we may substitute, obtaining $$(E-E_c)f(t_1,\alpha)+E_k=E\frac{R_5}{R_4+R_5}+e_g$$

or $$f(t_1,\alpha)=\frac{E}{E-E_c}\,\frac{R_5}{R_4+R_5}+\frac{e_g-E_k}{E-E_c} \qquad (7)$$

Now in a practical circuit $E_k \doteq e_g$ and $E_c \ll E$. To a first approximation therefore $$f(t_1,\alpha)=\frac{R_5}{R_4+R_5} \qquad (8)$$

Transposing:

$$t_1=f\left(\alpha_1\frac{R_5}{R_4+R_5}\right) \qquad (9)$$

This means that to a first approximation the period of time elapsing between initiation of the active mode (cutoff of $V_0$) and the point at which the gating tube $V_4$ is first made ready to accept an input pulse and to shift the switching section to the stable mode of conduction is a function only of the resistance divider $R_4R_5$ and of the physical constants of the sawtooth generator. This period is the timing period utilized for divider action. Consequently the division ratio is substantially independent of variations in the value of E, the $B^+$ supply. The essential fact is that the expression for the timing waveform (in its transient phase) contains as a factor a term very nearly equal to E, and that the threshold voltage is algebraically a fraction of E. So long as these two conditions are satisfied, the division ratio will have approximate independence of E. Imperfections in the approximation due to the use of a separate bias supply may be eliminated by deriving the bias from the $B^+$ supply which furnishes E, as is done in the embodiment of Fig. 8.

In the circuit of Fig. 3 the only amplifier tube in the usual sense of the word is the cathode follower $V_2$ which is of well-known stability. The other tubes are employed only as switches so that variations in heater voltage and tube aging are of little consequence. The "voltage per step," i. e. the change in sawtooth level on the plate of $V_0$, on the cathode of $V_2$, and (above the threshold) on the cathode of $V_3$, which occurs between successive input pulses, is a measure of the stability of the dividing factor under which the circuit operates. With practical values for the applied potential difference E, the "voltage per step" may amount to 20 or 30 volts or more even for factors of division of the order of 10 or 20 or more. This minimizes the possibility that the condenser will be discharged on another than the intended pulse $a_k$. The threshold voltage $e_d$ is of course preferably adjusted to a value which places the time $t_1$ at which the cathode of $V_2$ reaches the threshold voltage approximately midway between the times of arrival of the pulses $a_{k-1}$ and $a_k$.

The division ratio may be varied by any means which alters, by an approximately integral number of input pulse periods, the time required for the sawtooth to reach the threshold voltage level established in the gate circuit. In the embodiment of Fig. 3 this may be achieved either by varying the value of the threshold voltage itself, through a shift in the relative values of the resistors $R_4$ and $R_5$ forming the potentiometer, or by changing the shape of the sawtooth voltage itself. The shape of the sawtooth voltage may be changed by varying the value of the charging resistor $R_2$, or by varying the value of the sawtooth condenser $C_1$. It may also be changed by varying the voltage towards which the sawtooth condenser $C_1$ is charged. Thus, without changing the voltage of the source of supply, a voltage bleeder may be provided between the positive rail at E and ground. The charging resistor in series with the sawtooth condenser is then returned to a variable tap on this bleeder. Substantial independence of $B^+$ supply variations does not require that the voltage toward which the sawtooth condenser is charged be identical with that to which the potentiometer in the threshold voltage circuit is connected. It is enough that the source of voltage for the two be a common one.

The waveform generator shown in the embodiment of Fig. 3 includes elements giving a high degree of linearization to the sawtooth voltage there produced. $V_6$, which conducts with substantially zero resistance during recycling, becomes an open circuit when generation of the sawtooth begins. The upper end of $R_2$ is raised by the large storage condenser $C_2$ as the cathode of $V_2$ rises, and $C_2$ provides the charge which builds up across $C_1$.

At some sacrifice in linearization $V_6$ may be replaced by a resistor. Linearization may be sacrificed altogther by omitting $C_2$ and its leads. The cathode follower $V_2$ which, in the absence of $C_2$ acts only as a buffer, may also be sacrificed without rendering the circuit inoperative. The plate of $V_0$ will then be connected directly to the plate of the threshold detector $V_3$. In such case, however, care should be taken that the parallel resistance from the cathode of $V_3$ to ground through $R_6$ in parallel with the bias resistor on the grid of $V_4$ be chosen much larger than $R_2$, the condenser charging resistor.

The embodiment shown in Fig. 3 is adapted to be driven by positive pulses, applied for starting to the cathode of the switch tube $V_0$ and for stopping to the suppressor in the gating tube $V_4$. The pulses can however be applied at other points, and the elements of the circuit identified with the start and stop functions vary accordingly.

Thus the start pulse, instead of being applied to the cathode of $V_0$, may be applied, through a suitable condenser and resistor in series, to the control grid of $V_5$, the other half of the switching section. The switching section of the embodiment of Fig. 3, so modified, is shown together with the gating tube in Fig. 5. In this circuit the start pulse lifts $V_5$ into conduction as a result of which $V_0$ is regeneratively cut off and the generation of the sawtooth waveform begins. Succeeding input pulses are attenuated at the grid of $V_5$ due to the low grid-cathode impedance of that tube during conduction compared to the series resistor $R_{51}$ through which the pulses are applied. The small negative pulses which are reproduced on the plate of $V_5$ are without effect however since they only drive the control grid of $V_0$ further negative. The start circuit therefore includes $C_{51}$ and $R_{51}$, $C_{51}$ being an isolation condenser which passes the input pulses. The stop gate is unchanged. When transition to the recycling mode is to occur, the positive stop pulse applied to the suppressor of $V_4$ is sufficiently amplified in that tube to more than compensate for the simultaneous positive pulse applied directly to the grid of $V_5$.

Figures 5, 6, 7:
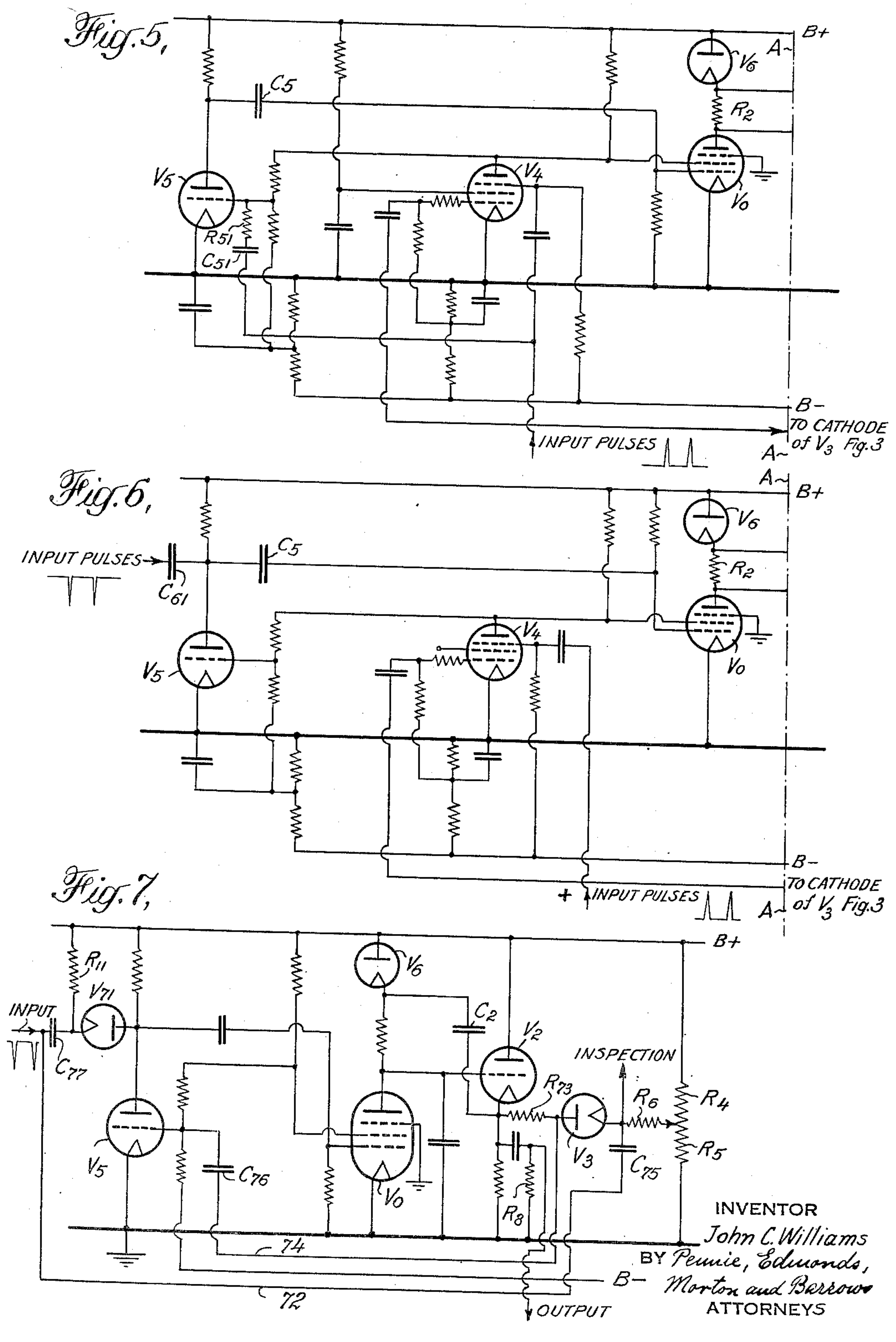
Fig. 5 illustrates a modification of the embodiment shown in Fig. 3, involving a change in the starting circuit; the elements of Fig. 5 being combined with those to the right of the line A—A in Fig. 3 to provide a complete frequency dividing circuit.
Fig. 6 illustrates another modification of the embodiment shown in Fig. 3, showing still another form of starting circuit. As with Fig. 5 the elements of Fig. 6 are to be combined with those to the right of the line A—A in Fig. 3 to provide a complete frequency dividing circuit.
Fig. 7 is a schematic diagram of another embodiment of my invention having the same switching section and waveform generator as that of Fig. 3 but having a modified starting circuit and stop gate.

If simultaneous positive and negative input pulses are available, the starting function may be performed by applying negative pulses to the grid of $V_0$ or, with equal effect, to the plate of $V_5$. The stopping pulses are applied to the suppressor grid of $V_4$ as before. This connection is illustrated in Fig. 6, which, like Fig. 5, is to be combined with that part of Fig. 3 to the right of the line A—A to provide a complete circuit. If the system of Fig. 3 modified according to Fig. 6 is assumed to be quiescent, with the switching section in its stable mode of conduction, $V_5$ will be cut off and $V_0$ will be conducting with its grid at zero bias. The negative input pulse applied through a D. C. isolation condenser $C_{61}$ to the plate of $V_5$ will be coupled through the condenser $C_5$ to the grid of $V_0$, stopping conduction there. $V_5$ is regeneratively turned on and the switching section is in the transient mode. During the growth of the sawtooth voltage, succeeding input pulses have no effect, either as applied negatively at the plate of $V_5$ or positively on the suppressor grid of $V_4$. The starting circuit therefore includes the condenser $C_{61}$. The starting circuit is effectively disconnected after initiation of the transient mode by the low plate cathode impedance of $V_5$ while conducting, which greatly attenuates the negative input pulses passed to the control grid of $V_0$. The stop circuit is unchanged from that of Fig. 3. When $V_4$ is rendered potentially conducting by the application of the gate voltage to its control grid, the next succeeding input pulse applied positively to the suppressor grid of that tube brings it into conduction, drops the grid of $V_5$ and raises its plate to lift the grid of $V_0$ into conduction. By virtue of the amplification in $V_4$ and $V_5$, the effect of a coincident negative input pulse on the plate of $V_5$ is more than overcome.

If it is preferred to work with negative input pulses only, the circuit of Fig. 3 as modified in Fig. 6 may be further modified to operate on negative pulses exclusively. Such an embodiment is shown in Fig. 7, which retains the switching section and waveform generator of Fig. 3, but employs different starting and stop gate connections.

In the circuit of Fig. 7 a diode $V_{71}$ is connected with its plate to the plate of $V_5$ and with its cathode returned to $B^+$ through a resistor $R_{71}$. When the circuit is in its stable mode of conduction, with $V_5$ off, there is no bias across $V_{71}$ so that a negative input pulse is passed to the grid of $V_0$, cutting off conduction there and initiating the transient mode. As $V_5$ then conducts, its plate drops, and $V_{71}$ is biased off to such an extent that the negative input pulses at its cathode are not passed. The starting circuit consisting of $V_{71}$ and $R_{71}$ is therefore disconnected.

During the initial portion of the sawtooth transient, reproduced on the plate of $V_3$ by the cathode follower $V_2$, the negative input pulses passed to the cathode of $V_3$ by the line 72 and isolation condenser $C_{75}$ are without effect at $V_3$ because of the positive bias imposed on the cathode of that tube by the threshold potentiometer $R_4R_5$. When the sawtooth brings $V_3$ to zero bias however, the next succeeding negative input pulse is passed by $V_3$ (now of low impedance compared to the series connection of $R_5$, $R_6$ and a resistor $R_{73}$ connected in the plate of $V_3$). $R_{73}$ prevents attenuation of the pulse by the low cathode impedance of $V_2$. The line 74 passes this negative pulse from the plate of $V_3$ to the grid of $V_5$ via a condenser $C_{76}$, and $V_5$ is cut off, to restore the circuit to its stable mode of conduction. The gating tube $V_4$ of Fig. 3 is thus dispensed with, and $V_3$ acts as stop gate as well as threshold detector. When the circuit is restored to its stable mode of conduction, the sawtooth voltage in the plate of $V_3$ drops, opening the stop gate. At the same time the cutting off of $V_5$ recloses for negative pulses the starting switch provided by $V_{71}$. $C_{76}$ in the grid connection of $V_5$ is chosen small enough to block the sawtooth on the plate of $V_3$ but large enough to pass the stop pulse. $C_{77}$, like $C_{75}$, is for D. C. isolation.

Figure 8:
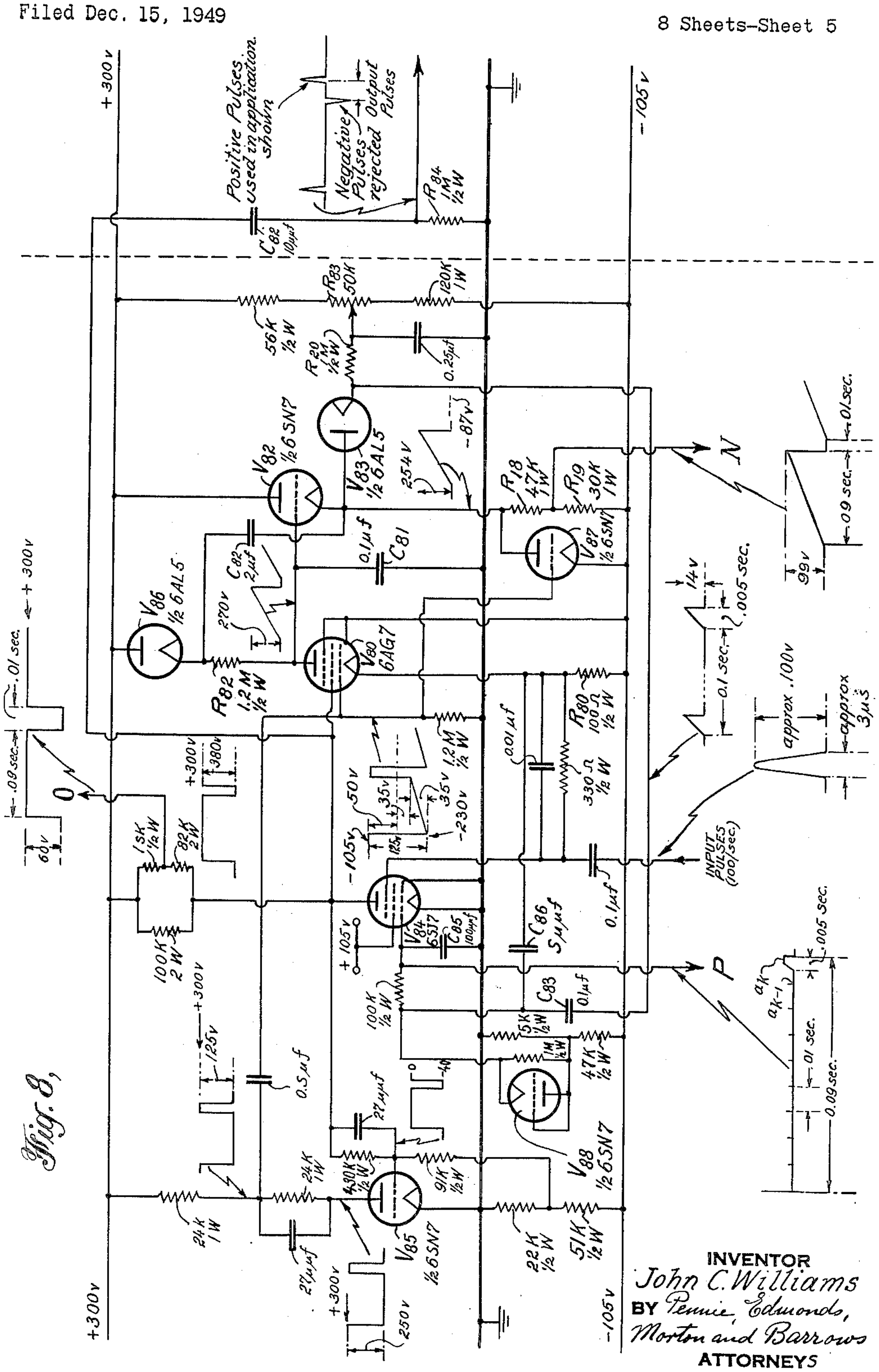
Fig. 8 is a schematic diagram of another embodiment of my invention showing component values employed in a circuit which has been built and successfully operated.

Fig. 8 shows a modification of the circuit of Fig. 3 including a number of refinements. There are included in Fig. 8 the values of circuit constants employed in an embodiment of the invention which was built and operated to divide a 100 C. P. S. signal into a 10 C. P. S. signal. In addition the waveforms existing at a number of points in the circuit are shown. In the circuit of Fig. 8 the potential across the potential divider and across the switch tube and series resistances and cathode follower in parallel therewith has been increased in order to maximize the "voltage per step" by utilizing the entire output of a power supply, of conventional type, not shown. Whereas the power supply as usual is grounded at a tap somewhere between the extremes of voltage available therefrom so as to provide a negative voltage for bias purposes the potentiometer, cathode follower and switch tube with its series resistances are connected across the entire range of voltage available instead of between the positive rail and ground. The connection to ground of the plate of the sweep condenser $C_{81}$ opposite the anode of the switch tube $V_{80}$ ties this plate of the condenser to a point of substantially fixed potential. A connection to ground rather than to the negative rail diminishes the total voltage to which the condenser is exposed without limiting the excursion of the positive plate thereof upon which depends the "voltage per step."

To adapt the circuit particularly to operation at low frequencies, for example for division of a 100 C. P. S. signal into a 10 C. P. S. signal, the embodiment of Fig. 8 includes a gated triode $V_{87}$ in the cathode circuit of the cathode follower tube $V_{82}$. This triode is gated on its grid by the voltage applied to the grid of the switch tube $V_{80}$. It therefore conducts during the recycling interval between the last pulse $a_k$ of one quotient cycle and the first pulse $a_{k+1}$ of the next. $V_{87}$ thus furnishes a low impedance path through which the storage condenser $C_{82}$ may be rapidly recharged. Without this tube, the loss of charge on the condenser $C_{82}$ during the sawtooth rise on the cathode of the cathode follower $V_{82}$ may be so great, especially in a circuit operated at low frequencies, as to leave the cathode of $V_{82}$ above its proper potential at the termination of the recycling period. The recycling period between the pulses $a_k$ and $a_{k+1}$ is too short to permit proper restoration of the charge on $C_{82}$ through the cathode resistances $R_{18}$ and $R_{9}$. This result is objectionable because it impairs linearity of the sawtooth, reduces its amplitude and hence reduces the voltage per step upon which the stability of operation depends. During the sawtooth rise in voltage on the sweep condenser $C_{81}$, the triode $V_{87}$ is cut off along with the switch tube $V_{80}$ and therefore plays no part in the performance of the circuit.

In addition the grid circuit of the gating tube $V_{84}$ includes a D. C. restorer $V_{88}$ which operates to eliminate control hysteresis. $V_{88}$ insures that grid current drawn by the gating tube $V_{84}$ does not result in lowering the bias level on the control grid of $V_{84}$ below the intended value. Without such a restorer tube the grid current drawn by $V_{84}$ during the gating pulse results in an altered bias at the grid of $V_{84}$. Moreover, this resultant bias differs with the quotient frequency, i. e. the repetition rate at which the gate is applied to this grid. Thus if during adjustment of the threshold voltage at the potentiometer $R_{83}$ the factor of division is shifted by one or more integers the variation in this average bias on the grid of $V_{84}$ will shift the point on the potentiometer $R_{83}$ at which the transition from division by one factor to the next factor occurs, according as the shift is from a greater factor to a lower factor or vice versa. The voltage per step is also slightly diminished by this hysteresis of control.

The embodiment of Fig. 8 also differs from that of Fig. 3 by the addition of a number of elements which make possible the convenient utilization of several waveforms which are available in the basic circuit of Fig. 3 (and in the modifications thereof heretofore described) and which are useful in monitoring the operation thereof. A tap denoted N in the cathode circuit of the cathode follower permits the withdrawal from the circuit of an exponential sawtooth of high linearity for use as a sweep voltage on a monitoring oscilloscope. This sweep voltage is locked in phase in its very origin with the input pulses and output pulses of interest. For use in an oscilloscope in conjunction with the sweep voltage drawn off at N an intensifying waveform may be drawn off at O in the plate circuit of the gating tube $V_{84}$, i. e. at the plate of the multivibrator element embodied in the switch tube $V_{80}$.

The operation of the circuit is examined on such a monitoring oscilloscope by applying to the vertical amplifier thereof a composite signal drawn off at P which combines a fraction of the input pulses with a fraction of the output of the diode $V_{83}$ which is applied to the grid of the gating tube $V_{84}$. In the circuit shown in Fig. 8 a condenser $C_{86}$ couples into the grid circuit of $V_{84}$ a fraction of the input pulses. A condenser $C_{85}$ added between the grid of $V_{84}$ and ground prevents these input pulses from firing $V_{84}$ prematurely. Since the inspection sweep taken off at N has a duration equal to the period of the output signal less one cycle of the input signal (i. e. without the recycling period), the inspection waveform taken off at P and displayed on the monitoring oscilloscope will show all of the input pulses which occur during one of the output signals and one fewer of the intervals between them, as indicated in the figure. The control voltage on the potentiometer $R_{83}$ may be adjusted during operation of the circuit to set the beginning of the gate midway between pulses $a_k$ and $a_{k-1}$ without interrupting operation of the circuit or changing the factor of division.

In the embodiment of Fig. 8 an output signal is shown having the form of a positive pulse. This output pulse, occurring once for each cycle of the quotient frequency, is derived by differentiating the square wave of the multivibrator at a condenser $C_{82}$ and resistor $R_{84}$, the negative pulses which occur at the end of the sawtooth sweep being rejected by an auxiliary clipping circuit not shown. Of course output signals may be taken at other points.

The basic circuit of Fig. 3 may also be realized with switching sections other than the monostable multivibrator there shown. Fig. 9 shows a circuit similar to the modification of Fig. 3 shown in Fig. 7 but employing in place of the monostable multivibrator (comprising $V_5$ and screen grid-cathode path in $V_0$ of Figs. 3 and 7) an Eccles-Jordan trigger pair $V_{97}$ and $V_{98}$. Accordingly, the pentode switch tube $V_0$ of Fig. 3 is replaced by a simple triode $V_{90}$ whose grid is tied to the grid of one of the Eccles-Jordan tubes. The tubes $V_{97}$ and $V_{98}$ are cross-connected between their plates and grids by D. C. connections. Elimination of the coupling condensers in the plate-grid connections of the usual multivibrator is an advantage when the quotient frequency is very low.

The embodiments so far described have employed a switching section essentially distinct from the waveform generator. This switching section has been employed to open and close a switch in the waveform generator (the plate-cathode path of $V_0$ in Fig. 3, for example. The switching section may however be even more closely integrated with the waveform generator, as in the embodiment illustrated in Fig. 10.

This embodiment retains the waveform generator of the embodiments previously described (except for substitution of a resistor $R_{104}$ for the linearizing diode $V_6$ of Fig. 3), and the start circuit and stop gate of Figs. 7 and 9. In Fig. 10 the switching section is embodied in a pentode $V_{101}$ connected as a phantastron. The phantastron is a circuit of the relaxation oscillator class and has as its principal element a pentode connected such that the plate and screen grid are returned through resistors to a source of potential positive with respect to cathode, the control grid through resistance to a potential equal to or more positive than that at the cathode, and the suppressor grid through resistance to a potential equal to or more negative than that at the cathode. It is characterized by two modes or states of conduction. Transfer from one state to the other may be self- or trigger-induced and is due to regenerative exchange of current between plate and screen grid, such regeneration arising from signal coupling between screen grid and suppressor grid. As applied to the present invention the phantastron is preferably arranged to be monostable. When a capacitor is connected between plate and control grid, the tube will develop at the plate during one of the modes a negative-going linear sawtooth, as will be further explained in connection with Figs. 11 and 13. $V_{101}$ also functions as the switch tube of the waveform generator. For a description of the phantastron see Close and Lebenbaum, Electronics, volume 21, page 100, April, 1948. The plate load consisting of $R_{104}$ and $R_{105}$ is chosen so that the load line of the tube intersects the plate current characteristic curve beyond its knee such that plate current remains high at zero bias. When the phantastron $V_{101}$ is in its stable mode, the grid is at zero bias, being returned to ground through $R_{107}$. The suppressor grid, returned to ground through $R_{102}$, is also at zero bias and plate is therefore conducting. The sawtooth condenser $C_1$ has been discharged through the plate-cathode path of the tube, and the plate rests at a constant low voltage. The screen current is fairly low because of the choice of load line.

A negative input pulse through $V_{102}$ is applied to the suppressor grid of the phantastron and reduces the voltage of that grid enough to cut off plate current. The pulse is insulated from the power supply by the resistor $R_{101}$. As plate current is cut off, the screen current rises sharply, dropping the screen voltage. The drop in screen voltage is applied through the coupling network $R_{101}$, $C_{102}$ to the suppressor grid, resulting in regenerative cutoff of the suppressor. The time constant $C_{102}R_{102}$ is chosen sufficiently large so that the suppressor remains cut off, and the plate remains cut off with it. Since plate circuit of $V_{101}$ is the switch for the sawtooth generator, the timing waveform is initiated and continues as long as the plate of $V_{101}$ is cut off. Cutoff bias on the suppressor biases off the diode $V_{102}$ so that subsequent input pulses are disconnected.

When a negative input pulse is finally passed through $V_3$, the threshold having been reached in that tube, it is applied to the control grid of $V_{101}$ across $R_{107}$, cutting off screen current in $V_{101}$. The screen rises, restoring the suppressor to zero bias level or higher. When the pulse terminates, the control grid returns to zero bias, the suppressor is above its cutoff level, and plate current flows. The screen current continues at the reduced value characteristic of the stable mode and the sawtooth condenser $C_1$ is rapidly discharged through the plate circuit. The next arriving input pulse finds $V_{102}$ conductive, and the active mode is reinitiated. Since the suppressor grid is cut off during the active mode, negative pulses applied to it during this mode do not affect the circuit so that the tube $V_{102}$ can be dispensed with, along with $R_{103}$.

Figure 11:
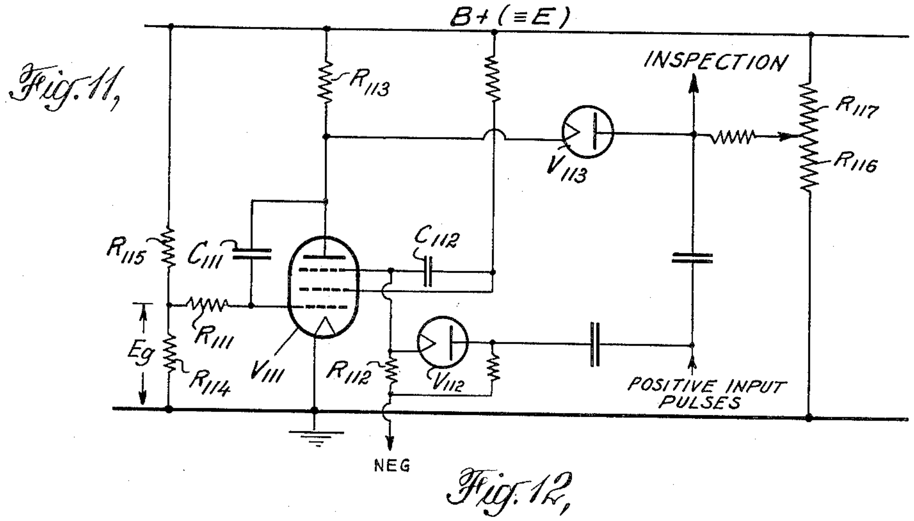
Fig. 11 is a schematic diagram of another embodiment of my invention employing a waveform generator different from that illustrated in the preceding figures.

The invention may be realized also with a timing waveform generator which produces a negative rather than a positive-going sawtooth voltage. An embodiment of the invention employing such a negative sawtooth voltage is shown in Fig. 11. The waveform generator is contained in the pentode $V_{111}$ connected as a phantastron sweep circuit. The grid of the tube is returned to a positive bias $E_g$ through $R_{111}$ and the suppressor grid is connected to a source of cutoff bias. The plate is coupled to the control grid through a condenser $C_{111}$ and the suppressor and screen grids are coupled together through a condenser $C_{112}$. In the stable mode of conduction of the tube the control grid is at zero bias, and the screen carries a heavy current so that the screen voltage is low. The plate is non-conducting by virtue of suppressor grid cutoff so that the plate voltage is E, that of the $B^+$ source. A negative pulse applied to the grid (or to the plate, from which it is coupled to the grid through $C_{111}$) momentarily cuts off all current in the tube. The screen voltage rises abruptly, and this rise in screen voltage is coupled through $C_{112}$ to the suppressor grid. When the pulse terminates, plate current is enabled to flow and the screen current consequently continues at a reduced value, since the sum of screen and plate currents in a pentode is roughly constant. Consequently the screen remains high, and the suppressor remains high also until $C_{112}$ is charged through the bias resistor $R_{112}$. A positive pulse applied to the suppressor grid serves as well as a negative pulse applied to the control grid to initiate the transient mode of conduction.

Upon termination of the triggering pulse, the control grid does not return completely to zero bias. Instead because of the presence of $C_{111}$ it returns only to a negative bias which satisfies the instantaneous plate-voltage plate-current relations for the tube. The total plate current will be the sum of the currents through the plate load resistor $R_{113}$ and through $C_{111}$. Since $C_{111}$ must eventually discharge through the plate-cathode path of the tube, the plate voltage will tend to drop. $C_{111}$ however provides a negative feedback path. The result is that the plate voltage excursion approximates to a negative sawtooth after an initial drop. The slope of this sawtooth is given to a good approximation by the expression $$\frac{E_g}{R_{111}C_{111}}$$

where $E_g$ is the voltage to which the grid is returned. In Fig. 11

$$E_g=E\frac{R_{114}}{R_{114}+R_{115}}$$

When left to itself, the phantastron of $V_{111}$ will restore itself to the stable mode when the plate voltage reaches the knee of the characteristic curve for the tube. In the frequency dividing circuit of Figure 11 however, as in the other embodiments of the present invention, the waveform generator is restored to the stable mode by the action of the gating circuit. To this end the natural duration of the transient mode is always chosen longer than the duration of the sawtooth voltage waveform employed. In the embodiment of Fig. 11 the waveform generator is restored to the stable mode, i. e. recycling is initiated, by the application of a positive pulse to the plate (and to the control grid). This positive pulse momentarily increases the screen current and drops the screen voltage. The regenerative coupling between the screen and suppressor grids lowers the suppressor voltage, reducing the plate current and increasing the screen current until plate current disappears and the grid is returned to zero bias.

The pentode $V_{111}$ of Fig. 11 performs both as sawtooth generator and switching section and requires in addition only a threshold and gating diode $V_{113}$ connected to the usual potentiometer $R_{116}R_{117}$ and a diode $V_{112}$ for the start and disconnect function.

With $V_{111}$ in the stable mode of conduction, its plate (and hence the cathode of $V_{113}$) is at $B^+$. $V_{113}$ is thus biased off by the potentiometer $R_{116}R_{117}$, and the positive input pulses are therefore not passed by $V_{113}$. $V_{112}$ however is at zero bias so that a positive input pulse, which is applied to its plate as well as to the plate of $V_{113}$, is passed to the suppressor grid of $V_{111}$, inducing transfer of $V_{111}$ to the transient mode. The negative sawtooth voltage generated at the plate of $V_{111}$ eventually carries the cathode of $V_{113}$ down to the threshold voltage of the potentiometer $R_{116}R_{117}$. Succeeding input pulses have meanwhile been effectively disconnected at $V_{112}$ by the bias across $R_{112}$, the suppressor of $V_{111}$ having risen to ground potential. The first input pulse arriving after $V_{113}$ reaches the threshold voltage passes through $V_{113}$ to the plate and grid of $V_{111}$ and restores the tube to the stable mode of conduction. Recycling then takes place, and the next input pulse begins the cycle anew.

Figure 12:
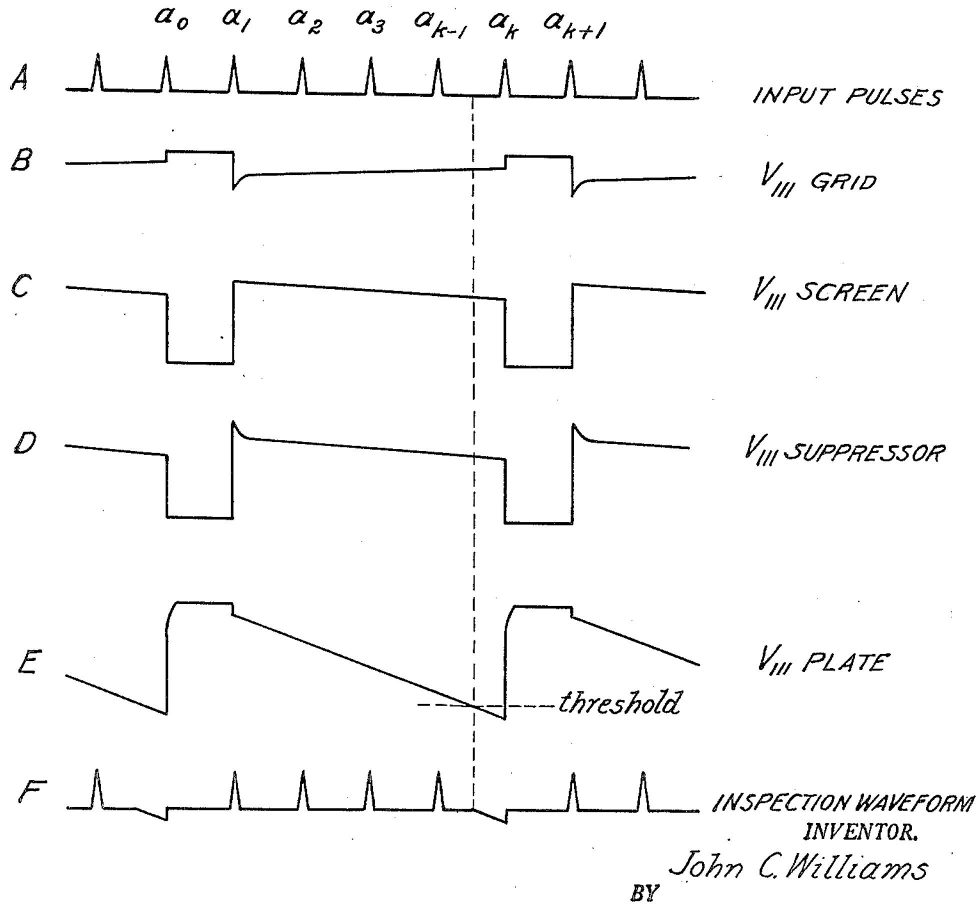
Fig. 12 is a representation of certain voltage waveforms to be found in the circuit of Fig. 11.

The operation of the circuit of Fig. 11 is further explained in the voltage waveforms shown in Fig. 12. In waveform A the positive pulse $a_1$, applied through $V_{112}$ to the suppressor grid of $V_{111}$ cuts off the screen current. Accordingly the screen voltage rises as shown in waveform C. Simultaneously plate current begins to flow as indicated by the drop in plate voltage at waveform E. When the plate voltage, between the pulses $a_{k-1}$ and $a_k$ falls below the threshold level, the gate at $V_{113}$ is closed (i. e. rendered conducting) and the next pulse $a_k$ is passed through $V_{113}$ to the plantastron tube $V_{111}$ where it stops the flow of plate current as explained above.

The division ratio can be varied not only by variation of the threshold voltage at the threshold potentiometer $R_{116}R_{117}$ but also by changing the slope of the sawtooth. Since the slope of the sawtooth depends on the voltage to which the grid of $V_{111}$ is returned, and upon the sizes of the condenser $C_{111}$ and of the grid resistor $R_{111}$, any one or more of these quantities may also be employed to change the division ratio.

Like the embodiments shown in Figs. 3 and 5–10, the embodiment of Fig. 11 possesses a high degree of stability in the face of variations in the $B^+$ voltage, as the following argument will show:

If the time required for the sawtooth voltage to reach the threshold is designated $t_1$, measured from the initiation of the sawtooth, the voltage corresponding to $t_1$ is given by $$e_p=t_1\cdot\frac{E_g}{R_{111}C_{111}}=t_1\frac{E\,R_{114}}{R_{114}+R_{115}}\,\frac{1}{R_{111}C_{111}}$$

The threshold voltage is $$e_d=E\frac{R_{116}}{R_{116}+R_{117}}$$

Hence at the instant the threshold is reached, $$e_p=e_d$$

and $$t_1\frac{R_{114}}{R_{114}+R_{115}}\,\frac{E}{R_{111}C_{111}}=E\frac{R_{116}}{R_{116}+R_{117}}$$

Therefore, $$t_1=\frac{R_{116}}{R_{116}+R_{117}}\,R_{111}C_{111}\,\frac{R_{114}+R_{115}}{R_{114}}$$

Thus the supply potential E vanishes as a factor in determining $t_1$, and the division ratio is independent of variations therein.

In the embodiment of Fig. 11 the switching section and sawtooth generator functions are both performed in the phantastron tube $V_{111}$. The gate circuit and threshold detector are both embodied in the diode $V_{113}$, and the starting circuit with its associated disconnect function are together embodied in the diode $V_{112}$.

Figure 13:
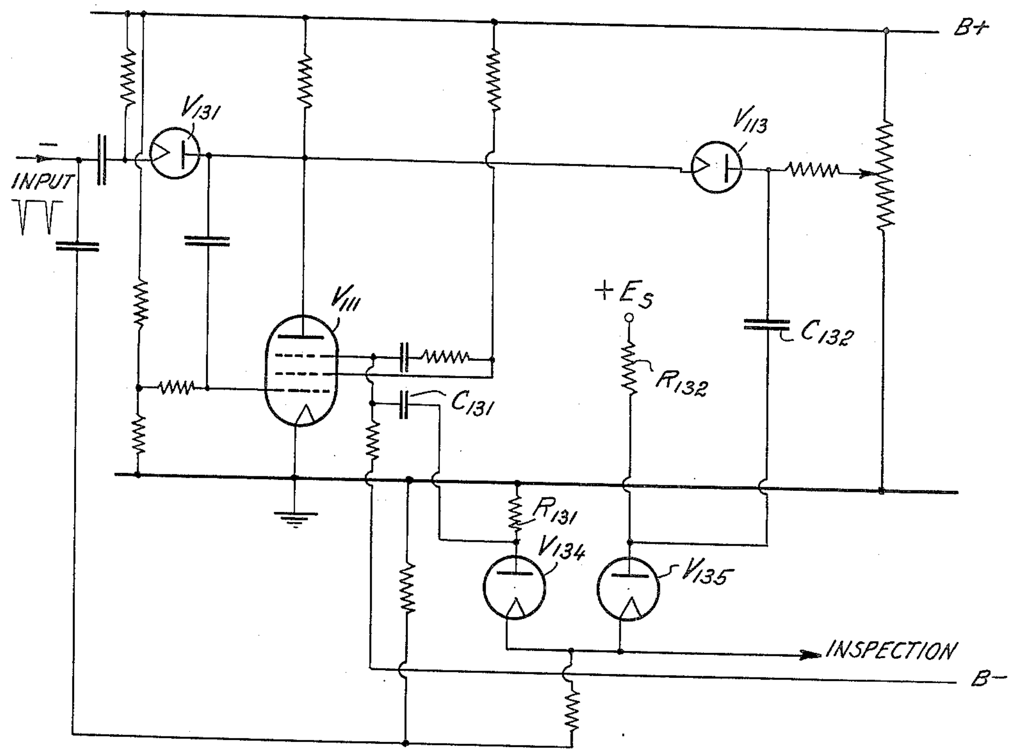
Fig. 13 is a schematic diagram of another embodiment of my invention similar to that of Fig. 11 but employing a modified starting circuit and stop gate.

If negative rather than positive input pulses are available, the circuit of Fig. 11 may be modified as shown in Fig. 13 to accommodate them in the following way:

Negative input pulses for starting are applied to the plate of $V_{111}$ through a diode 131 having its plate connected to the plate of $V_{111}$ and its cathode returned through a resistor to $B^+$. In the stable mode of conduction this diode is therefore at zero bias and will pass to the plate and grid of $V_{111}$ a negative pulse applied to its cathode, thus initiating the transient mode of conduction in $V_{111}$. The starting circuit provided by this diode is thereupon disconnected by the bias placed across it as its plate falls with the plate of $V_{111}$. This is the starting circuit of Figs. 7 and 9.

The stop pulse, instead of being applied as a positive pulse through $V_{113}$ to the plate of $V_{111}$, is applied as a negative pulse to the suppressor grid of $V_{111}$ through a separate gating circuit. This gating circuit comprises a pair of diodes $V_{134}V_{135}$ having a common cathode connection. The plate of the first diode $V_{134}$ is connected through a condenser $C_{131}$ to the suppressor of $V_{111}$ and returned (for D. C.) through a resistor $R_{131}$ to ground. The second diode $V_{135}$ has its plate returned through a resistor $R_{132}$ to a point of positive bias but is connected through a condenser $C_{132}$ to the plate of $V_{113}$, now serving as a threshold detector only. Until the negative sawtooth on the plate of $V_{111}$ reaches the threshold value established at the plate of $V_{113}$, the negative input pulses are blocked in the first of the gating diodes since the cathode thereof is held above its plate (which is at ground) by virtue of conduction in $V_{135}$. When however the sawtooth passes the threshold voltage, the plate of $V_{113}$ is lowered, and the plate of the second diode is lowered with it so as to remove the bias on $V_{134}$. The next arriving negative input pulse is therefore enabled to function as a stop pulse, passing through $V_{134}$ to the suppressor grid of $V_{111}$.

If both positive and negative input pulses are available (occurring simultaneously), the negative pulses may be applied through a start-disconnect diode to the plate of $V_{111}$ as last described, with the positive pulses applied for stopping purposes to the plate of $V_{113}$ which again acts both as a threshold detector and gating tube as shown in Fig. 11.

For the sake of ease in following the modifications of the embodiment first described (that of Fig. 3), I have in describing other embodiments employed, retained the same reference characters for circuit elements in such other embodiments which perform substantially the same function as do the similarly referenced elements of Fig. 3. In some cases, these circuit elements perform other functions as well, in addition to their function in the embodiment of Fig. 3. It will be understood however that changes in the values of such components may be required by the modifications described, and the use of the same reference characters is not intended to imply identity throughout all embodiments of the values and parameters of such circuit elements having the same reference characters.

My invention may be embodied in many forms, all fulfilling the basic requirements of the block diagram of Fig. 1. The embodiments of Figs. 3, 5–11 and 13 which have been described herein are illustrative of my invention and not exhaustive thereof.

I claim:

1. In a device for frequency division, a circuit including at least two electron discharge paths and having two modes of conduction of which the first is stable and the second transient, said circuit being adapted to generate a sawtooth wave of voltage while in the second of its two said modes of conduction, two signal channels connecting the circuit with a source of pulse signals having the repetition rate of the frequency to be divided, said circuit being adapted to be shifted in its mode of conduction each time a pulse reaches it through either of the said signal channels, means to render one of said channels conducting only when said circuit is in the first of its said modes, and means to render the other of said channels conducting only when said circuit is in the second of its said modes and when the sawtooth wave of voltage exceeds a given value, said second-named means including a threshold detector to which the sawtooth voltage of said circuit is applied.

2. In a device for frequency division, a circuit including at least two electron discharge paths and having two modes of conduction, said circuit being adapted to generate a sawtooth wave of voltage while in the second of its two said modes of conduction, two signal channels connecting the circuit with a source of pulse signals having the repetition rate of the frequency to be divided, said circuit being adapted when in the first of its said modes to be shifted from the first to the second of said modes each time a pulse reaches it through a first one of said channels and adapted when in the second of said modes to be shifted from the second to the first of said modes each time a pulse reaches it through the second of said channels, and means to render the second of said channels conducting only when said circuit is in the second of its said modes and when the sawtooth wave of voltage exceeds a given value, said second-named means including a threshold detector to which the sawtooth voltage of said circuit is applied.

3. In a circuit for frequency division, a sawtooth generator, a switching circuit having two modes of conduction the first of which is stable and the second of which is transient, means linking the generation of the sawtooth with the transient mode of conduction of the switching circuit, a first signal channel adapted to apply input pulses of the frequency to be divided to the switching circuit for shifting it from the stable to the transient mode of conduction, a second signal channel adapted to apply input pulses of the frequency to be divided to the switching circuit for shifting it from the transient to the stable mode of conduction, and means to disable the second signal channel except when the sawtooth voltage exceeds a specified level, said means including a threshold detector for establishing the said specified level.

4. In a circuit for frequency division, a sawtooth generator, a switching circuit having two modes of conduction, means linking the generation of the sawtooth with one of the modes of conduction of the switching circuit, a first signal channel adapted to apply input pulses of the frequency to be divided to the switching circuit for shifting it from the second to the first of the said modes of conduction, a second signal channel adapted to apply input pulses of the frequency to be divided to the switching circuit for shifting it from the first to the second of the said modes of conduction, and means to disable the second signal channel except when the sawtooth voltage exceeds a specified level, said means including a threshold detector for establishing the said specified level.

5. In a circuit for frequency division, a resistance connected in series with a switch between a pair of terminals, a capacity having one plate connected to the junction of the switch and resistance and having its other plate connected to a point of substantially fixed potential, a potential divider having its ends connected between the said terminals, a diode having its cathode connected through a resistance to a movable tap on the potential divider, means to apply to the plate of the diode a potential substantially proportional to the potential across the capacity, means to open the switch in response to a cycle of the signal to be divided, and means to close the switch responsive only to the combined action of the signal to be divided and the output of the diode cathode above a threshold value established by the setting of the potentiometer.

6. In a circuit for frequency division, a resistance connected in series with a first multi-electrode electron discharge tube between a pair of terminals with the resistance in the anode circuit of the said tube, a capacity having one plate connected to the anode of the said tube and having the other plate thereof connected to a point of substantially fixed potential, a potential divider having its ends connected between the said terminals, a diode having its cathode connected through a resistance to a movable tap on the potential divider, means to apply to the plate of the diode a potential representative of the potential on the anode of the first multi-electrode tube, and means to apply pulses rep- first multi-electrode tube alternately non-conducting and conducting in response respectively to a cycle of the signal to be divided and to a cycle of the signal to be obtained, said last-named means comprising an electron discharge tube connected in multivibrator relation with the screen-to-cathode path of the first multi-electrode tube, a second multi-electrode electron discharge tube having its control and suppressor grids separately biased to cutoff, an alternating current connection between the diode cathode and one of the said grids of the second multi-electrode tube, and means to apply pulses representative of the signal to be divided so as to increase positively the grid-to-cathode voltage of the second multi-electrode tube with respect to the second of its biased grids and so as to diminish the control grid-to-cathode voltage of the first multi-electrode tube.

7. In a circuit for frequency division, a condenser, a resistor and a first multi-electrode electron discharge tube connected in series between a pair of terminals with the resistor in the anode circuit of the said tube, one of the plates of the condenser being connected to the junction of the resistor and the anode of the said tube, the other plate of the condenser being connected to a point of substantially fixed potential, a potential divider having its ends connected between the said terminals, a diode having its cathode connected through a resistor to a movable tap on the potential divider, means to apply to the anode of the diode a potential substantially proportional to the voltage across the condenser, a multivibrator including as one of its electron discharge paths the screen grid-cathode path of the first multi-electrode tube, a second multi-electrode tube having its plate connected to the screen grid of the first multi-electrode tube, two of the grids of the second multi-electrode tube being separately biased negatively beyond cutoff, means to apply to the cathode of the first multi-electrode tube and to one of the negatively biased grids of the second multi-electrode tube a positive signal representative of the frequency to be divided, and means to apply to the other of the negatively biased grids of the second multi-electrode tube a signal representative of the alternating current potential at the cathode of the diode, the second multi-electrode tube being adjusted to conduct only upon the co-existence of the said signals on its two negatively biased grids.

8. In a circuit for frequency division, a first multi-electrode electron discharge tube connected in series with an impedance between a pair of terminals, the impedance including a resistance connected in the anode circuit of the said tube, a condenser having one of its plates connected to the anode of the first multi-electrode tube and having the other of its plates connected to a point of substantially fixed potential, a potentiometer having its end points connected between the said terminals, a diode having its cathode connected through a resistance to a movable tap on the potentiometer, means to apply to the anode of the diode a potential representative of the voltage across the condenser, a multivibrator including as one of its electron discharge paths the screen grid-cathode path of the first multi-electrode tube, a second multi-electrode tube having its plate connected to the screen grid of the first multi-electrode tube, two of the grids of the second multi-electrode tube being separately biased negatively to cutoff, means to apply to the cathode of the first multi-electrode tube and to one of the negatively biased grids of the second multi-electrode tube a positive signal representative of the frequency to be divided, and means to apply to the other of the negatively biased grids of the second multi-electrode tube a signal representative of the alternating current potential at the cathode of the diode, the second multi-electrode tube being adjusted to conduct only upon the co-existence of the said signals on its two negatively biased grids.

9. In a circuit for frequency division, a first multi-electrode electron discharge tube connected in series with an impedance between a pair of terminals, the impedance including a resistor connected in the anode circuit of the first multi-electrode tube, a condenser having one of its plates connected to the anode of the first multi-electrode tube and having the other of its plates connected to a point of substantially fixed potential, a potentiometer having its end points connected between the said terminals, a diode having its cathode connected through a resistance to a movable tap on the potentiometer, a cathode follower connected between the said terminals of the source of potential difference, the grid of the cathode follower being connected to the one plate of the condenser, the cathode of the cathode follower being coupled to the anode of the diode, a multivibrator including as one of its electron discharge paths the screen grid-cathode path of the first multi-electrode tube, a second multi-electrode tube having its plate connected to the screen grid of the first multi-electrode tube, two of the grids of the second multi-electrode tube being separately biased negatively to cutoff, means to apply to the cathode of the first multi-electrode tube and to one of the negatively biased grids of the second multi-electrode tube a positive signal representative of the frequency to be divided, and means to apply to the other of the negatively biased grids of the second multi-electrode tube a signal representative of the alternating current potential at the cathode of the diode, the second multi-electrode tube being adjusted to conduct only upon the coexistence of the said signals on its two negatively biased grids.

10. In a circuit for frequency division, a condenser connected in series with a resistor between a pair of terminals, a multi-electrode switching vacuum tube having a low impedance when conducting, said switching tube being connected together with a resistor in its cathode circuit in parallel with the condenser, a vacuum tube arranged as a cathode follower connected between the said terminals with its grid connected to the anode of the switching tube, a diode connected with its plate to the cathode of the cathode follower and with its cathode connected through a resistor to a point intermediate the ends of a potential divider connected between the said terminals, two electron discharge elements connected as a multivibrator, one of the said elements including the screen grid-cathode path of the switching tube, whereby conduction in the switching tube is linked to the conduction cycle of the multivibrator, a gating tube having its suppressor and control grids biased beyond cutoff, and an alternating current connection between the cathode of the diode and the control grid of the gating tube, means to apply a positive signal representative of the frequency to be divided to the suppressor grid of the gating tube and to the cathode of the switching tube, the gating tube being so biased on its suppressor and control grids that the gating tube conducts only upon the co-existence of a positive signal representative of the frequency to be divided on its suppressor grid and of a signal representative of the diode output on its control grid.

11. In a circuit for frequency division, a condenser connected in series with a resistance, a first multi-electrode tube adapted to effectively short circuit the condenser when conducting, a diode, means to apply to the plate of the diode a signal representative of the voltage at the terminal of the condenser adjacent the anode of said tube, means to vary the direct current potential of the cathode of the diode, a multivibrator including as one of its electron discharge paths the screen-grid cathode path of the first multi-electrode tube, a second multi-electrode tube having its plate connected to the screen grid of the first multi-electrode tube, two of the grids of the second multi-electrode tube being separately biased negatively beyond cutoff, means to apply to the cathode of the first multi-electrode tube and to one of the negatively biased grids of the second multi-electrode tubes a positive signal representative of the frequency to be divided, means to apply to the other of the negatively biased grids of the second multi-electrode tube a signal representative of the potential at the cathode of the diode when conducting, the second multi-electrode tube being adjusted to conduct only upon the co-existence of the said signals on its two negatively biased grids.

12. In a circuit for frequency division, a condenser connected in series with a resistance between a pair of terminals, a first pentode having its anode connected to the junction of the condenser and resistance and having a resistor in its cathode circuit, a cathode follower connected in series with its cathode load between the said terminals, the grid of the cathode follower being connected to the said junction, a diode connected with its anode to the cathode of the cathode follower and with its cathode connected through a resistor to a point intermediate the ends of a potential divider connected between the said terminals, a multivibrator including as one of its electron discharge paths the screen grid-cathode path of the first pentode, a second pentode having its plate connected to the screen grid of the first pentode and having its control and suppressor grids separately biased to cutoff, means to apply to the cathode of the first pentode and to the suppressor grid of the second pentode a positive signal representative of the frequency to be divided, and means to apply to the control grid of the second pentode a signal representative of the signal on the cathode of the diode.

13. In a circuit for frequency division, a resistance connected in series with a first multi-electrode electron discharge tube between a pair of terminals with the resistance in the anode circuit of the said tube, a capacity having one plate connected to the anode of the said tube and having the other plate thereof connected to a point of substantially fixed potential, a potential divider having its ends connected between the said terminals, a diode having its cathode connected through a resistance to a movable tap on the potential divider, a vacuum tube connected in a cathode follower circuit between the said terminals, with the grid thereof connected to the anode of the first multi-electrode tube and the cathode thereof connected to the plate of the diode, and means to render the first multi-electrode tube alternately non-conducting and conducting in response respectively to a cycle of the signal to be divided and to a cycle of the signal to be obtained, said means including a vacuum tube connected in multivibrator relation with the screen-to-cathode path of the first multi-electrode vacuum tube, a second multi-electrode tube having its control and suppressor grids separately biased to cutoff, an alternating current connection between the diode cathode and one of the said grids of the second multi-electrode vacuum tube, and means to apply positive pulses representative of the signal to be divided to the other of the biased grids of the second multi-electrode tube and to the cathode of the first multi-electrode tube.

14. In a circuit for frequency division according to claim 13, a gated triode having its plate-to-cathode path connected in parallel with at least a portion of the cathode impedance of the cathode follower, the grid of said gated triode being connected to the control grid of the first multi-electrode tube.

15. In a circuit for frequency division according to claim 13, a restoring diode connected between the grid of the second multi-electrode tube and the grid bias source thereof.

16. In a circuit for frequency division according to claim 13, a signal mixing network for inspection purposes comprising an alternating current coupling between the cathode of the first multi-electrode tube and the cathode of the diode.

17. In a circuit for frequency division, a resistance connected in series with a switch between a pair of terminals, said switch forming the plate-cathode path of a pentode having capacitive coupling between the plate and control grid and between screen and suppressor grids, said pentode having a positive bias on the control grid and cutoff bias on the suppressor grid, a capacity providing the said plate-control grid coupling, a potential divider having its ends connected between said terminals, a diode having its plate connected through a resistance to a tap on the potential divider, means to apply to the cathode of the diode a potential substantially proportional to the potential across said resistance, means to open the switch in response to a cycle of the signal to be divided and means to close the switch responsive only to the combined action of the signal to be divided and the signal on the plate of the diode.

18. In a circuit for frequency division, a resistance connected in series with a switch between a pair of terminals, a capacity having one plate connected to the junction of the switch and resistance and having its other plate connected to a point of substantially fixed potential, a potential divider having its ends connected between the said terminals, a diode having one electrode connected through a resistance to a tap on the potential divider, means to apply to the other electrode of the diode a potential substantially proportional to the potential across the capacity, means to open the switch in response to a cycle of the signal to be divided and means to close the switch responsive only to the combined action of the signal to be divided and the signal on the first electrode of the diode above the threshold value established by the setting of the potentiometer.

19. A frequency dividing circuit comprising a pentode connected as a phantastron with capacitive plate-control grid and suppressor-screen grid coupling, the control grid being returned through a resistance to a point of positive bias and the suppressor being connected through a resistance to a point of cutoff negative potential; a threshold and gating diode having its cathode connected to the plate of the pentode and its plate connected through a resistance to a tap on a potentiometer, a starting diode having its cathode connected to the pentode suppressor and its plate connected to the source of suppressor bias, an alternating current signal path connecting the plates of the diodes, and means to apply positive pulses having the repetition rate of the frequency to be divided to the said diode plates.

20. In a circuit for frequency division, a resistance connected in series with a switch between a pair of terminals, said switch forming the plate-cathode path of a pentode having capacitive coupling between the plate and control grid and between screen and suppressor grids, said pentode having a positive bias on the control grid and cutoff bias on the suppressor grid, a capacity providing the said plate-control grid coupling, a potential divider having its ends connected between the said terminals, a diode having its plate connected through a resistance to a movable tap on the potential divider, means to apply to the cathode of the diode a potential substantially proportional to the potential across the resistance in series with the switch, means to open the switch in response to a cycle of the signal to be divided, and means to close the switch responsive only to the combined action of the signal to be divided and the signal on the plate of the diode.

21. In a circuit for frequency division, an electronic switch including an anode, a cathode, and a control grid, said switch being adapted to be opened and closed by raising and lowering the potential of the control grid with respect to the cathode, a sawtooth condenser having one plate connected to the anode of the switch and the other plate connected to a point of substantially fixed potential, a threshold diode having its cathode connected through a resistance to a point intermediate the ends of a potentiometer, means to apply to the plate of the threshold diode a potential substantially proportional to the potential at the anode of the switch, an electron discharge device having two modes of conduction, means linking the potential of the control grid of the switch with that of a chosen point in the said device whereby the switch is open during one of the said modes of conduction and closed during the other, means to shift said device from one mode of conduction to the other in response to a pulse of the frequency to be divided, and separate means including said threshold diode to shift the said device from the other to the first of said modes of conduction, said separate means being responsive only to the coexistence of a pulse of the frequency to be divided and a potential on the plate of the threshold diode equal to or greater than the potential at the cathode thereof.

22. In a circuit for frequency division, a pentode operated as a phantastron connected in series with a resistance in its plate circuit between a pair of terminals, a capacity connected between the plate and cathode of the pentode, a threshold diode having its cathode connected through a resistance to a tap on a potentiometer connected between the said terminals, means to apply to the plate of the diode a potential proportional to the potential across the capacity, means to apply negative pulses of the frequency to be divided to the suppressor grid of the pentode and to the cathode of the diode, and means to apply to the control grid of the pentode pulse voltages appearing at the plate of the diode.

23. In an electronic device for frequency division, a switch tube connected in series with a resistance between a pair of terminals, a sawtooth condenser in parallel with the plate-cathode path of the switch tube, a threshold diode having its cathode connected through a resistance to a tap on a potentiometer connected between the said terminals, means to apply to the plate of the threshold diode a potential proportional to the potential across the sawtooth condenser, and means to control conductivity in the plate-cathode path of the switch tube in response to pulse shaped signals of the frequency of the signal to be divided, said means including a circuit having two electron discharge paths so interconnected as to be alternately conducting and non-conducting, means to apply pulses of the frequency to be divided to said circuit and to the cathode of the diode, and means to apply to said circuit pulse-shaped voltages appearing at the plate of the diode.

24. In a circuit for frequency division, an electronic switch connected in series with a resistance between a pair of terminals, said switch including a grid adapted to open and close the switch in accordance with the potential level of the said grid, a sawtooth condenser having one plate connected to one terminal of the switch and the other plate connected to a point of substantially fixed potential, a threshold diode having its cathode connected through a resistance to a tap on a potentiometer connected between the said terminals, an electron discharge device having two control grids and two modes of conduction, said two modes of conduction being characterized by different fixed potential levels at each of said control grids, means to tie the potential of the grid of the switch to the potential of one of the said control grids, means to apply negative pulses having the repetition rate of the frequency to be divided to the cathode of the threshold diode and to the control grid in the said device tied to the grid of the switch, and means to transmit to the other control grid in the said device pulse-shaped variations in the potential at the plate of the threshold diode.

JOHN C. WILLIAMS.

References Cited in the file of this patent

UNITED STATES PATENTS

| Number | Name | Date |
|---|---|---|
| 2,428,913 | Hulst | Oct. 14, 1947 |
| 2,468,058 | Grieg | Apr. 26, 1949 |
| 2,477,047 | Davis | July 26, 1949 |
| 2,532,534 | Bell | Dec. 5, 1950 |
| 2,574,253 | Duffy | Nov. 6, 1951 |